US006523173B1

United States Patent
Bergner et al.

(10) Patent No.: US 6,523,173 B1
(45) Date of Patent: Feb. 18, 2003

(54) METHOD AND APPARATUS FOR ALLOCATING REGISTERS DURING CODE COMPILATION USING DIFFERENT SPILL STRATEGIES TO EVALUATE SPILL COST

(75) Inventors: Peter Edward Bergner, Apple Valley, MN (US); Edward Curtis Prosser, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,978

(22) Filed: Jan. 11, 2000

(51) Int. Cl.⁷ .................................................. G06F 9/45
(52) U.S. Cl. ...................................... 717/152; 717/158
(58) Field of Search ................................ 717/151, 152, 717/154–161; 707/5; 709/100–108; 712/233–240

(56) References Cited

U.S. PATENT DOCUMENTS

| 4,571,678 | A |   | 2/1986 | Chaitin et al. | 717/156 |
|---|---|---|---|---|---|
| 5,249,295 | A | * | 9/1993 | Briggs et al. | 717/157 |
| 5,724,590 | A | * | 3/1998 | Goettelmann et al. | 717/154 |
| 5,784,066 | A | * | 7/1998 | Aizikowitz et al. | 345/440 |
| 5,946,491 | A | * | 8/1999 | Aizikowitz et al. | 717/158 |
| 5,966,537 | A | * | 10/1999 | Ravichandran | 717/158 |
| 5,974,438 | A | * | 10/1999 | Neufeld | 709/104 |
| 6,044,221 | A | * | 3/2000 | Gupta et al. | 717/151 |
| 6,090,156 | A | * | 7/2000 | MacLeod | 717/157 |
| 6,233,732 | B1 | * | 5/2001 | Matsuyama et al. | 717/151 |
| 6,292,934 | B1 | * | 9/2001 | Davidson et al. | 717/158 |

OTHER PUBLICATIONS

Peter Bergner, Peter Dahl, David Engelbretsen & Matthew O'Keefe, *Spill Code Minimization via Interference Region Spilling,* ACM SIGPLAN '97 Conference on Programming Languages Design and Implementation, SIGPLAN Notices 32, 5, pp. 287–295 (May, 1997).

David Bernstein, Dina Goldin, Martin Golumbic, Hugo Krawczyk, Yishay Mansour, Itai Nahshon & Ron Pinter, *Spill Code Minimization Techniques for Optimizing Compilers,* ACM SIGPLAN '89 Conference on Programming Languages Design and Implementation, SIGPLAN Notices 24, 7, pp. 258–263 (Jul., 1989).

Preston Briggs, Keith Cooper, Ken Kennedy & Linda Torczon, *Coloring Heuristics for Register Allocation,* ACM SIGPLAN '89 Conference on Programming Languages Design and Implementation, SIGPLAN Notices 24, 7, pp. 275–283 (Jul. 1989).

Preston Briggs, Keith Cooper & Linda Torczon, *Rematerialization,* ACM SIGPLAN '92 Conference on Programming Languages Design and Implementation, SIGPLAN Notices 27, 7, pp. 311–321 (Jul., 1992).

(List continued on next page.)

*Primary Examiner*—Gregory Morse
*Assistant Examiner*—Hoang-Vu Antony Nguyen-Ba
(74) *Attorney, Agent, or Firm*—Roy W. Truelson

(57) ABSTRACT

Register allocation during computer program code compilation is accomplished by determining a set of spill candidates, by evaluating a cost function for each spill candidate using a plurality of spill strategies, and by selecting the spill candidate having the lowest cost function value. Preferably, the set of possible spill candidates is determined by the Chaitin method of constructing an interference graph of all live ranges of symbolic registers, and iteratively removing nodes and placing them on a stack. Preferably, multiple spill strategies are represented as varying numbers of deaths N of live ranges of other symbolic registers, a spill strategy N signifying that spill code is introduced whenever the number of deaths occurring between two successive uses of a symbolic register equals or exceeds N. In the preferred embodiment, the cost is a function of the number, type and frequency of each operation introduced by the spill, and is divided by a benefit factor represented as the degree of the node.

16 Claims, 7 Drawing Sheets

OTHER PUBLICATIONS

Preston Briggs, *Register Allocation via Graph Coloring*, Ph.D. Thesis Rice COMP TR92–183, Department of Computer Science, Rice University, Apr. 1992.

Gregory Chaitin, Marc Auslander, Asbok Chandra, John Cocke, Martin Hopkins & Peter Markstein, *Register Allocation via Coloring*, Computer Languages vol. 6, No. 1, pp. 47–57 (1981) (month is not available).

G. J. Chaitin, *Register Allocation & Spilling via Graph Coloring*, ACM SIGPLAN '82 Symposium on Compiler Construction, SIGPLAN Notices 17, 6, pp. 98–105 (Jun. 1982).

* cited by examiner

601

STRATEGY

| | $S_1$ | $S_2$ | $S_3$ | ... |
|---|---|---|---|---|
| REG. R1 | $CR1_1$ | $CR1_2$ | $CR1_3$ | ... |
| REG. R2 | $CR2_1$ | $CR2_2$ | $\infty$ | ... |
| REG. R3 | $CR3_1$ | $CR3_2$ | $CR3_3$ | ... |
| ⋮ | ⋮ | ⋮ | ⋮ | |

FIG. 6

METHOD AND APPARATUS FOR ALLOCATING REGISTERS DURING CODE COMPILATION USING DIFFERENT SPILL STRATEGIES TO EVALUATE SPILL COST

FIELD OF THE INVENTION

The present invention relates to digital data processing systems, and in particular to compilers used to compile programming code for execution on a computer processor.

BACKGROUND OF THE INVENTION

A modern computer system typically comprises a central processing unit (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating computer programs were developed. In particular, a number of high-level languages for writing computer programs have been created.

High-level languages vary in their characteristics, but all such languages, are intended to make it easier for a human to write a program to perform some task. Typically, high-level languages represent instructions, fixed values, variables, and other constructs in a manner readily understandable to the human programmer rather than the computer. Such programs are not directly executable by the computer's processor. In order to run on the computer, the programs must first be transformed into a form that the processor can execute.

The process of transforming a high-level language program into a processor-executable form is called compilation. In general, a compiler is a special-purpose program which transforms one representation of a computer program into another representation. Usually, this means transforming a human-readable program in a high-level language (source code) to a processor-executable form (object code). However, some compilers perform only an intermediate step in the full transformation from high-level language to executable object code.

A computer processor typically contains a fixed number of high-speed registers for the temporary storage of data. These are the work space of the processor, much as a desk might be the work space of a person. Numerical and logical operations performed by the processor are performed on data in its registers. Demand for registers is typically at a premium. An office worker can not keep on the desk every paper or other object he or she might possibly need; some things must go in drawers, others in file cabinets, still others may be put in archive boxes. Similarly, the computer processor usually keeps only a small amount of data in its registers, and stores most of it in caches, main memory, or on mass storage devices such as disk drives.

Every variable used in a computer program must at some time be placed in a processor register for execution of some instruction. Since the number of registers in a processor is usually much smaller than the number of variables in a program executing on the processor, it is not possible to simply assign a different register to each variable. The process of assigning variables to registers at various parts of the program's instruction stream is known as register allocation. Just as it would be inefficient for our office worker to clutter the desk with infrequently used items, the performance of a computer system depends upon the efficiency of the register allocation. If registers are allocated in an inefficient manner, the computer will keep infrequently used data in its registers while it spends an inordinate amount of time retrieving data it needs from memory or remote storage locations.

Register allocation is typically performed as part of the program compilation process. Register allocation is a problem of almost infinite complexity. It is virtually impossible to discern in advance what is the best register allocation for a program, because, even laying aside the enormous number of possible permutations of register assignments, there is no foolproof way of knowing whether one allocation is better than another without knowing what data will be input to a program and what branches will be taken when the program executes. The best one can hope for is a good register allocation.

Numerous prior art register allocation schemes exist. One common method uses the concept of "live ranges" or "lifetimes" of program variables. The "live range" of a particular program variable is the span of instructions for which the variable contains valid data, and may be computed in a number of different ways. An interference graph is constructed of all live ranges in an instruction stream. Hardware registers are assigned to nodes (representing live ranges) in the interference graph, a process known as "coloring". This is analogous to coloring a map, where adjacent countries are given different colors, since adjacent nodes in the interference graph must be assigned different hardware registers. If a live range in the interference graph cannot be colored, it must be spilled, meaning that the variable must be stored in another location (usually memory) rather than keeping its value in a register. Since the processor can only operate on data stored in its registers, spilling a live range variable implies that the value must be loaded from memory into a register when it is needed, and stored back to memory when changed.

Spilling a live range variable requires the insertion of instructions into the instruction stream to perform the necessary stores to memory and loads from memory. These instructions are known as "spill code". The presence of spill code in the instruction stream reduces the performance of the computer program, because additional instructions are added, and because each execution of a load implies that the processor must wait to receive the data.

It is to be expected that the current trend toward increased programming complexity will continue, and that the problem of efficient register allocation will increase in scope absent improved methods for assigning program variables to registers.

SUMMARY OF THE INVENTION

In accordance with the present invention, register allocation during program compilation is accomplished by determining a set of spill candidates, by evaluating a cost function for each spill candidate using a plurality of spill strategies, and by selecting the spill candidate having the lowest cost function value.

In the preferred embodiment, the set of possible spill candidates is determined by the Chaitin method of constructing an interference graph of all live ranges of symbolic registers. Live ranges (nodes) are then removed from the graph iteratively, and placed on a stack. Nodes are eligible for removal from the graph if the number of edges connecting a node to other nodes is less than the number of processor registers. Once a live range node has been removed, all its edges are removed, which may have the effect of making other nodes eligible for removal. When it is not possible to remove any more nodes, a spill candidate is selected, and removed from the graph. If additional nodes can then be removed from the graph, they are removed. The process repeats until no more live ranges remain.

In the preferred embodiment, multiple strategies for spilling are represented as varying measures of "distance" N between successive mentions of a symbolic register, a spill strategy N signifying that spill code is introduced whenever the "distance" occurring between two successive mentions of a symbolic register equals or exceeds N. Specifically, in the preferred embodiment the measure of distance is the number of live ranges of other symbolic registers which terminated (known as the number of "deaths") between successive mentions of the symbolic register under consideration.

In the preferred embodiment, the cost function is a summation of the number of each type of operation (such as a load or a store) introduced by the spill times the cost of the type of operation times a weighted frequency factor. This raw cost is further refined by dividing by a benefit factor representing an estimate of the benefit of removing the node from the graph. Preferably, the benefit factor is the number of edges connected to the node representing the symbolic register, known as the degree of the node.

The details of the present invention, both as to its structure and operation, can best be understood in reference to the accompanying drawings, in which like reference numerals refer to like parts, and in which:

BRIEF DESCRIPTION OF THE DRAWING

FIG. 6 is a conceptual view of a cost matrix representing costs for differing spill strategies.

DETAILED DESCRIPTION OF THE PREFERRED EMBODIMENT

OVERVIEW

Figure 1:
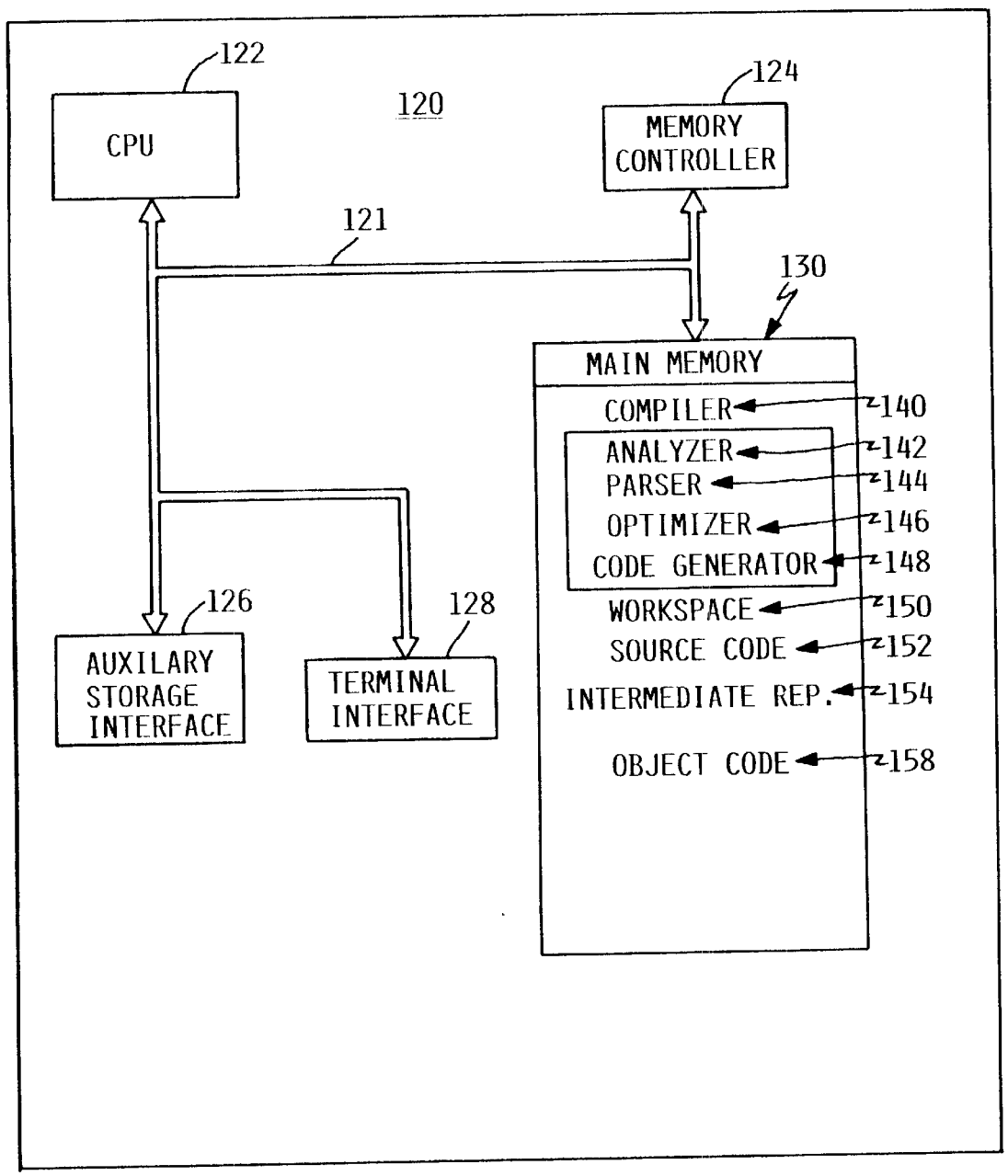
FIG. 1 is a high-level block diagram of a computer system, according to the preferred embodiment of the present invention.

Prior to discussing the operation of embodiments of the invention, a brief overview discussion of compilers and compiling techniques is provided herein.

Most computer programs are constructed using one or more high-level programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used herein, generically refers to any mechanism that transforms one representation of a computer program into another representation of that program This machine readable form, within this specification, is a stream of binary instructions (i.e., ones and zeroes) that are meaningful to the computer. Compilers generally translate each human readable statement in the source code instruction stream into one or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers". The methods and apparatus discussed herein apply to all types of compilers, including cross compilers.

Physical Registers, Symbolic Registers, Lifetimes

During the first pass or stage, one type of compiler typically assumes that an unlimited number of physical registers are available for the target CPU to use. Thus, each time a new program variable is encountered, it is assigned a new register in the intermediate language. However, in reality, the number of processor registers is fixed and is typically much smaller than the number of program variables in a typical computer program. Since the registers used in the intermediate language instruction stream have no correlation to physical processor registers, they are known as symbolic registers. During the second pass or stage, the optimizing compiler typically must allocate a large number of symbolic registers to a much smaller number of physical registers available to the processor. This process, known as register allocation, is the subject of the method and apparatus of the present invention.

As described above, register allocation in a compiler typically uses the concept of "live ranges" or "lifetimes". Both of these terms are used interchangeably herein. A "live range" for a variable, which may be a variable from the source program or a temporary variable generated by the compiler, is typically defined by a set of instructions for which the value contained in the symbolic register that represents the variable will be used in a subsequent computation. The live range for a variable begins when the variable is first defined, and spans the range of all mentions of the variable. Note that the definition of live range used herein is simplified for purposes of illustrating the concepts of the present invention. For example, a live range may actually contain multiple definitions and last uses for a variable. Those skilled in the art are familiar with the concept of live ranges, and the simplified definition used herein shall not be construed as limiting the application of the present invention. In addition, the term "symbolic register" as used herein encompasses all forms of variables in various different instruction streams, including source code instruction stream 152, intermediate representation instruction stream 154, or any other suitable form of instruction stream.

Register Allocation Mechanisms and Spill Code

A common mechanism for allocating registers in optimizing compilers uses live ranges represented in an interference graph. Physical processor registers are then allocated to the live ranges using a graph coloring technique that is well known in the art. If all the live ranges of symbolic registers may be allocated to the physical processor registers, the optimizing compiler produces a machine code instruction stream without spill code. If one or more of the symbolic registers cannot be allocated to a processor register, a live range is "spilled", meaning that the live range is allocated to a memory location rather than to a register, and therefore must be loaded into a register from memory before use, and must be written back to memory after being changed. Loads and stores to memory take considerably longer than operations to registers, and minimizing the number of loads and stores to memory is thus a primary goal of an optimizing compiler in order to minimize the execution time of the machine code instruction.stream. If the live range is spilled, spill code (i.e., memory loads and stores) must be added to the intermediate language instruction stream to accomplish the required accesses to memory. The loading and storing of spilled live ranges adds overhead to the machine code instruction stream, slowing its execution time, and slows compilation time due to the extra processing to make decisions concerning the insertion of spill code. Therefore, an optimizing compiler typically has a goal of efficiently allocating processor registers to the highest number of symbolic registers possible while minimizing spill code in order to minimize both the compile-time and run-time overhead associated with spill code.

Spill Code Generation in Known Register Allocation Mechanisms for Compilers

A well-known mechanism for allocating registers in an optimizing compiler was developed by Gregory J. Chaitin of IBM, as disclosed in U.S. Pat. No. 4,571,678, "Register Allocation and Spilling Via Graph Coloring", herein incorporated by reference; Gregory J. Chaitin et al, "Register Allocation Via Coloring", Computer Languages, vol. 6, pp. 47–57 (1981); and Gregory J. Chaitin, "Register Allocation & Spilling Via Graph Coloring", SIGPLAN '82 Symposium on Compiler Construction, SIGPLAN Notices, Vol. 17, No. 6, pp. 98–105 (June 1982). An extension of the Chaitin register allocation scheme was proposed by Preston Briggs et al. in "Coloring Heuristics for Register Allocation", Proceedings of the SIGPLAN '89 Conference on Programming Language Design and Implementation, ACM Press, Vol. 24, No. 7, pp. 275–284 (July 1989). While the register allocation method of Chaitin differs from the Briggs approach, both use similar techniques to generate spill code for a node to be spilled.

Figure 2:
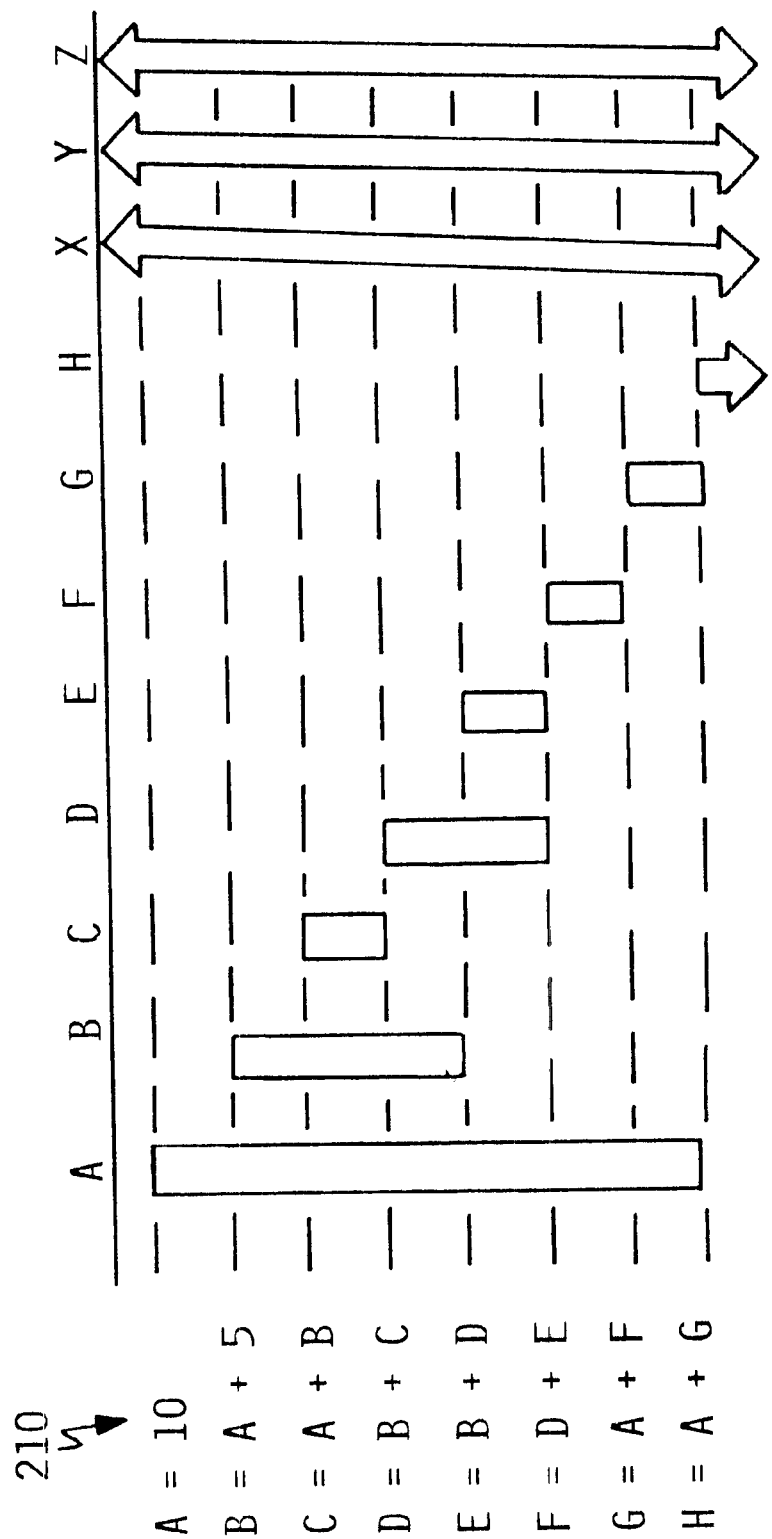
FIG. 2 is an illustration of an example instruction stream showing the live ranges for symbolic registers in the instruction stream.

Chaitin/Briggs typically operate on an intermediate language instruction stream, i.e., the instruction stream that results from the first pass of stage of an optimizing compiler. An exemplary instruction stream 210 is shown in FIG. 2. To illustrate the concepts of the present invention, instruction steam 210 is a simplified representation of an intermediate language instruction stream. Intermediate language code is divided into "basic blocks", each block being a sequence of instructions having a single entry point and a single exit (usually a branch). While instruction stream 210 shown in FIG. 2 may appear to be straight-line code such as that found within a basic block, in reality instruction stream 210 may bridge many basic blocks. Instruction stream 210 represents the relevant instructions within the instruction stream, no matter where they are located and regardless of the number of intervening (and thus unshown) instructions. Instruction stream 210 is shown for purposes of illustration and simplifying the discussion herein, and one skilled in the art will appreciate that the description herein with respect to instruction stream 210 is not limited by any particular format or configuration of the instruction stream used.

Referring to FIG. 2, the live ranges for each of the symbolic registers in instruction stream 210 are shown by the bars to the right of the instruction stream. In general, overlapping live ranges represent interferences between live ranges. Note that some live ranges (e.g., X, Y and Z of FIG. 2) may span the entire instruction stream 210. To the far right of FIG. 2 is a column indicating register pressure for each statement or instruction in instruction stream 210.

Figure 3:
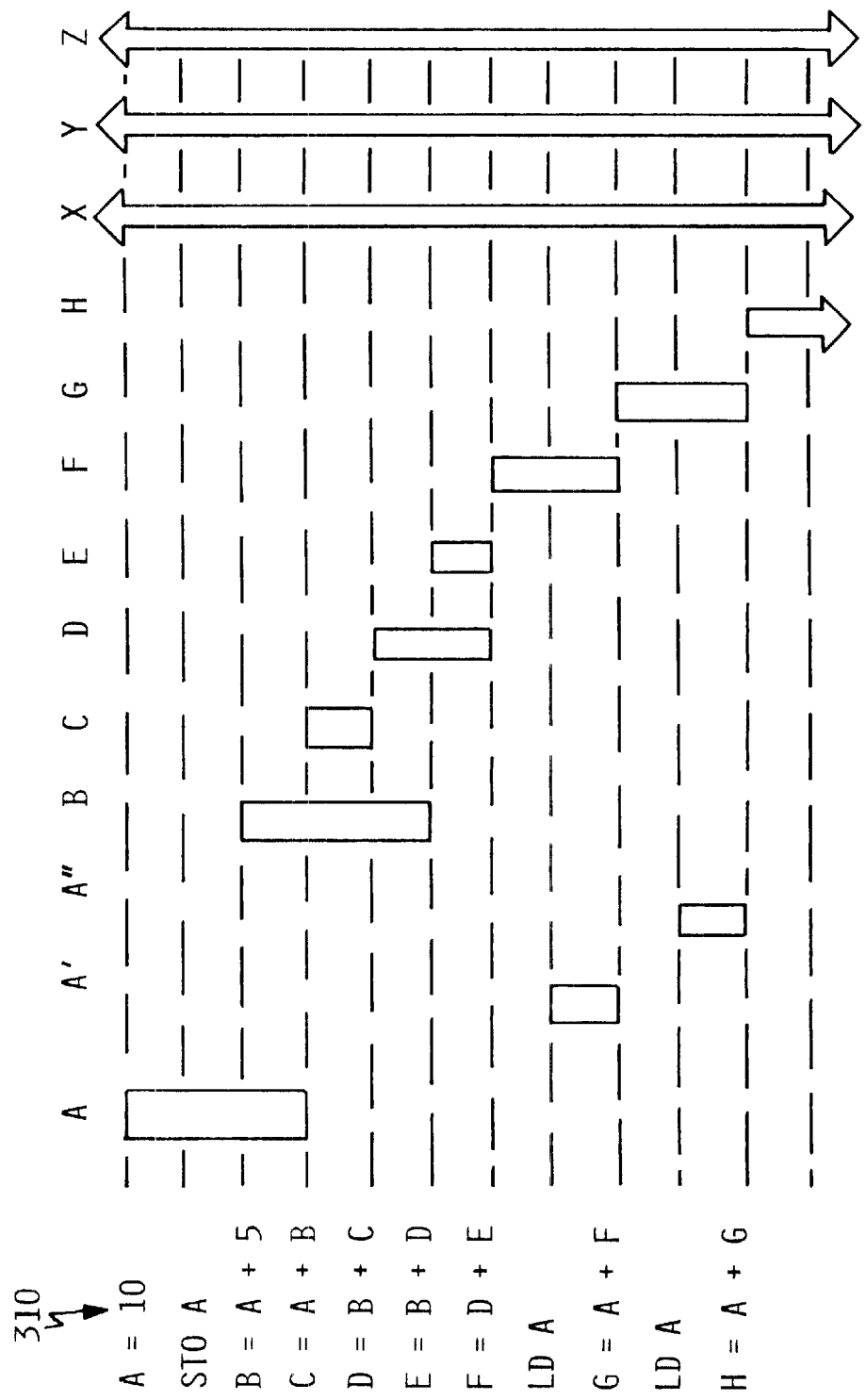
FIG. 3 is an illustration of an instruction stream that results from applying the Chaitin/Briggs approach to spilling symbolic register A in the instruction stream of FIG. 2.

If symbolic register A is selected for spilling, the Chaitin/Briggs approach for generating spill code inserts a store instruction after every definition of the symbolic register, and inserts a load instruction before every use of the symbolic register, where there has been at least one death since the last mention of the symbolic register. Referring to FIG. 3, the instruction stream 310 that results from applying the Chaitin/Briggs spill everywhere approach includes load and store instructions that break up the live range of A into many smaller live ranges, which are designated A, A' and A" in FIG. 3. Note that this spill approach succeeds in reducing the maximum number of ranges which are live at a given time (also known as "register pressure"), but may generate unnecessary spill code in some cases.

Chaitin's approach may be viewed as a relatively aggressive strategy, because it generates a lot of spill code. Various modifications to Chaitin's basic approach have been proposed. In particular, some less aggressive alternatives would spill smaller portions of the live range of a symbolic variable to reduce the number of loads and stores, Additionally, some strategies restrict the set of spill candidates to provide a hopefully better selection.

In general, a less aggressive spill strategy is likely to produce fewer loads and stores, but is also less likely to find a solution to the problem. The merit of Chaitin's basic approach is that it usually converges on a solution (produces a colorable interference graph) more rapidly than less aggressive approaches. Less aggressive spill strategies are likely to produce fewer loads and stores, but at the risk of requiring more time to solve the coloring problem.

Because it is felt that a less aggressive spill strategy will produce a better solution if it finds a solution at all, one approach is to try a relatively less aggressive strategy, and if no solution is found, to try a relatively more aggressive strategy. This approach may be used iteratively until a solution is found. However, due to the heuristic nature of the analysis, there will be cases in which the more aggressive strategy will produce a better solution.

DETAILED DESCRIPTION

Referring to the Drawing, wherein like numbers denote like parts throughout the several views, FIG. 1 shows a high-level block diagram of computer system 120 consistent with the preferred embodiment. The hardware component of computer system 120 could be implemented as an IBM AS/400 computer. But, the mechanisms and apparatus consistent with the invention apply equally to any computer system, regardless of whether the computer system is a complicated, multi-user computing apparatus or a single user device such as a personal computer or workstation. As shown in FIG. 1, computer system 120 includes main or central processing unit (CPU) 122 connected through bus 121 to main memory 130, memory controller 124, auxiliary storage interface 126, and terminal interface 128.

Auxiliary storage interface 126 allows computer system 120 to store and retrieve information from auxiliary storage such as magnetic disk, magnetic tape or optical storage devices. Auxiliary storage interface 126 could be fixed or removable media and also could be located on another computer system. Memory controller 124 moves information between main memory 130, auxiliary storage interface 126, and CPU 122. Bus 121 is a data communication path represented at a high level. While for the purposes of explanation, memory controller 124 is shown as a separate entity, and bus 121 is shown as a single entity, in practice portions of the function provided by memory controller 124 may actually reside in the circuitry associated with CPU 122 and main memory 130, and bus 121 may actually be multiple buses separated by interfaces of various sorts. Further, while memory controller 124 of the embodiment is described as having responsibility for moving requested information between main memory 130, auxiliary storage interface 126 and CPU 122, the mechanisms of the present invention apply equally to any storage configuration regardless of the number and type of the storage entities involved.

Terminal interface 128 allows system administrators,; computer programmers, and users to communicate with computer system 120, normally through programmable workstations. Terminal interface 128 may support one or many such terminals.

Main memory 130 stores software, including compiler 140 (comprising analyzer 142, parser 144, optimizer 146, and code generator 148) and operating system 132. Memory 130 also includes workspace 150, which stores a computer program in various stages of compilation, including source-code representation 152, intermediate representation 154, and object code 158. But memory 130 will not necessarily always contain all parts of all code and data shown. For example, portions of compiler 140 and operating system 132 may be stored on magnetic or optical disk storage devices. Moreover, the various representations 152, 154, and 158 of a computer program may not be resident in the main memory at the same time. Various representations may also be created by modifying a prior representation in situ. In addition, as discussed above, the front-end and back-end of the compiler, in some systems, may be separate programs.

CPU 122 executes code resident in memory 130, and in particular executes code comprising compiler 140 to compile computer programs in accordance with the preferred embodiment of the present invention. While it is preferred that the compiling mechanism of the present invention be computer code executing on a general purpose computer processor, it could alternatively be implemented using a combination of special purpose hardware and/or software.

Computer system 120 is merely an example of one system upon which the routines in accord with the principles of the present invention may execute. Further, as innumerable alternative system designs may be used, principles of the present invention are not limited to any particular configuration shown herein. For example, although the system depicted in FIG. 1 contains only a single main CPU and a single system bus, the invention also applies to computer systems having multiple CPUs and buses.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as auxiliary storage interface 126.

In the preferred embodiment, a programmer creates a source code representation of a program to be compiled. Source code 152 is stored in memory 130 of computer 120, and compiler 140 is invoked. Analyzer 142 and parser 144 portions of compiler 140 generate an intermediate representation 154 of the program under compilation. The intermediate representation does not include register assignments. At this point, the compiler has generated a plurality of symbolic registers in the intermediate representation for each variable or other construct requiring temporary storage of a value. All of these steps are well known in the compiler art, and will not be described in detail here.

Optimizer 146 operates on intermediate representation 154 to produce optimized code. Among the tasks of the optimizer (although not necessarily the only task) is the allocation of registers, which is described in greater detail below. Code generator 148 then produces machine-executable object code 158 from the data generated by optimizer 146, including register assignment data. Again, these steps are well known, and will not be described in detail here.

Figure 4:
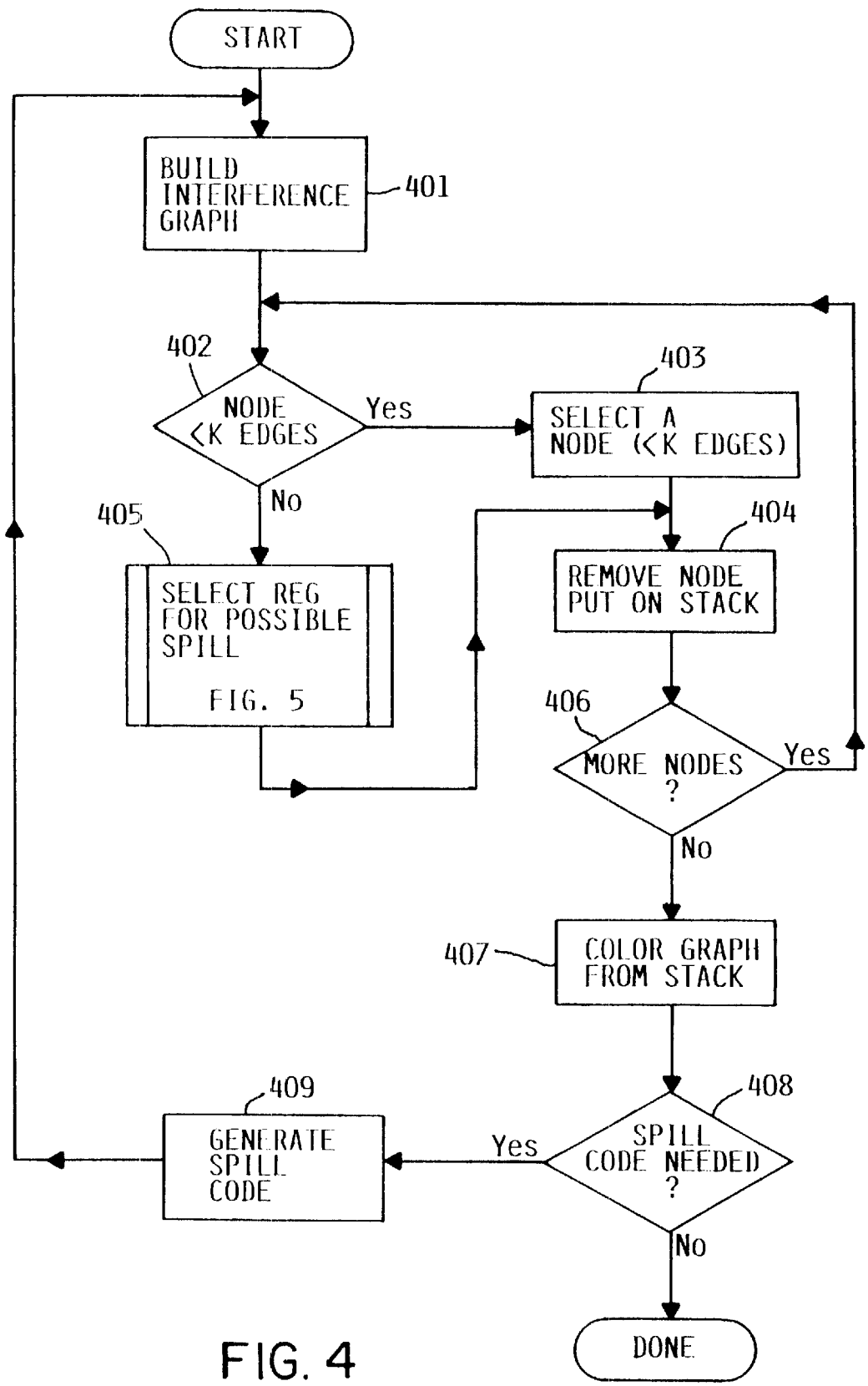
FIG. 4 is a high-level flowchart of steps performed by the optimizer in order to allocate registers, according to the preferred embodiment.

FIG. 4 is a high-level flowchart of steps performed by the optimizer in order to allocate registers. Register allocation in the preferred embodiment is performed using a method similar to the well-known Chaitin/Briggs method, but the selection of spill registers is done according to a different algorithm. As shown in FIG. 4, the first step in the register allocation process is to build an interference graph 401. The interference graph is constructed from the intermediate code representation 154. This intermediate code is broken into basic blocks of code, where each basic block is a sequence of instructions having a single entry point and a single exit point, the exit point usually being a branch instruction. Thus, it is possible for multiple instructions to branch to the first instruction in a basic block (multiple paths of entry), and it is possible for the exit point to have multiple successors or branch targets, but between these points the program must follow a single path. The basic blocks and their topology provide a framework for analysis, from which it is possible to determine the respective live range of each symbolic register. From these live ranges, it is possible to determine which live ranges overlap, i.e., which symbolic registers are simultaneously live at any single point in the code, which generally means the symbolic registers "interfere", requiring separate physical registers. Each symbolic register is represented in the interference graph as a single node. For each pair of symbolic registers whose live ranges interfere with each other, the interference is represented in the graph as an edge between the two nodes representing the symbolic registers. The construction of the interference graph is in accordance with the well-known Chaitin method, further described in U.S. Pat. No. 4,571,678.

The graph is then iteratively simplified by removing successive nodes. It will be observed that if any node has fewer than K edges, where K is the number of physical hardware registers available for assignment, then it will always be possible to assign a physical register to the symbolic register represented by the node. As represented by step 402, the graph is searched for a node having fewer than K edges. If there are nodes with fewer than K edges, one such node is selected (step 403). The selected node, along with all its edges, is removed from the graph, and the symbolic register it represents is placed on a reduction stack, for later assignment to a physical register (step 404). If additional nodes remain in the graph (step 406), the graph is again searched for a node with fewer than K edges. The removal of a node with its edges may reduce the number of edges in one or more other nodes below K, and therefore the process must repeat iteratively until all nodes have been removed, or all remaining nodes have K or more edges.

If, at some point, all remaining nodes have K or more edges, the "No" branch from step 402 will be taken. In order to continue the process of register allocation, it is necessary to select one of the remaining symbolic registers for placement on the reduction stack. Because this symbolic register will have at least K edges, a possibility exists that it will be necessary to generate spill code for the register that is chosen. (In fact, at this point it is unknown whether spill code will actually be necessary, but in the case of nodes with fewer than K edges, it is known that spill code will not be necessary, and hence the selection among such nodes is of lesser significance.) Therefore, it is important to choose the symbolic register carefully, as the proper selection can have a significant effect on the amount of spill code generated, and the ultimate performance of the compiled code.

Figure 5:
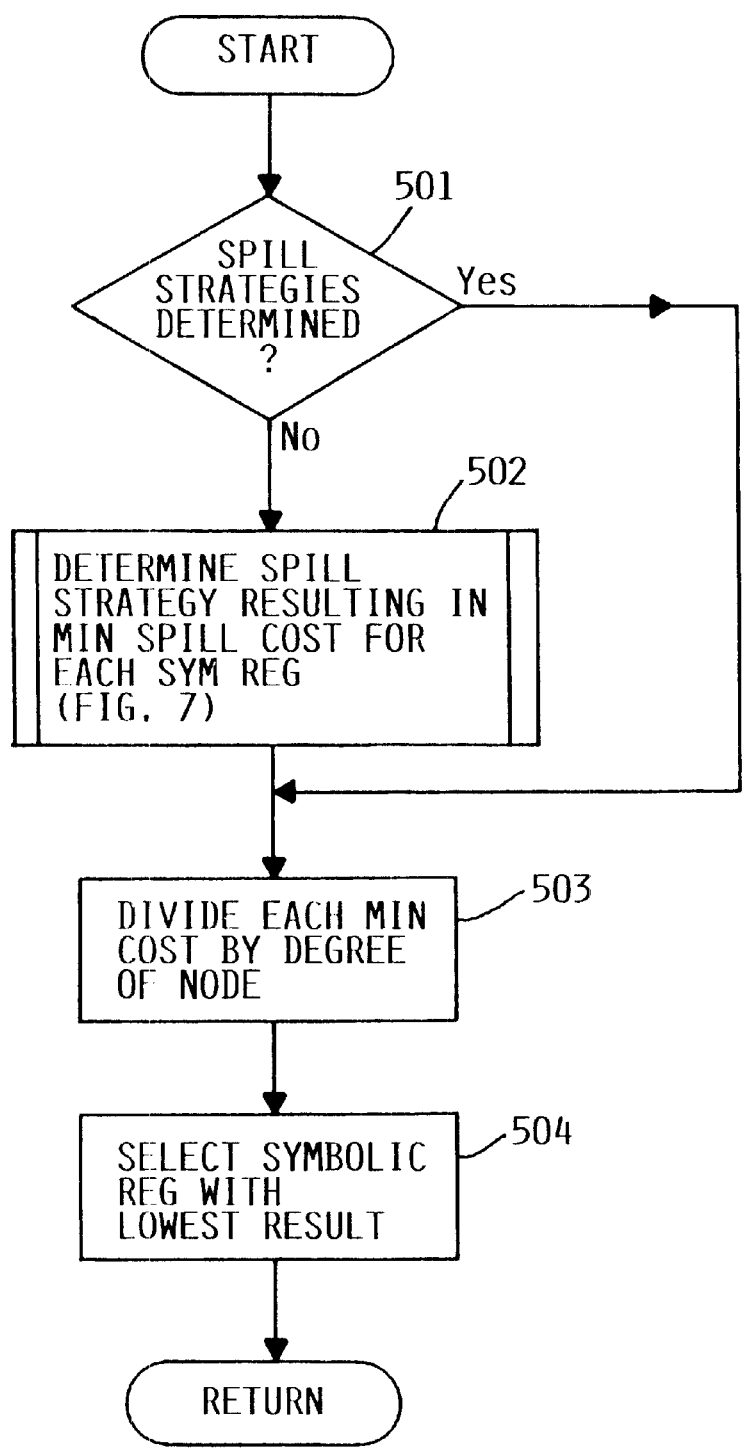
FIG. 5 is a flowchart showing in greater detail the steps performed by the optimizer when selecting a symbolic register for possible spilling, according to the preferred embodiment.

The process of selecting a symbolic register to place on the stack when all nodes have at least K edges is shown as a single block 405 in high-level FIG. 4, and is illustrated in greater detail in FIG. 5.

The first step to selecting a symbolic register for placement on the stack is to determine a spill strategy which results in the minimal spill cost for each symbolic register, represented as step 502. In fact, this computation (described below) is performed only once for each iteration of steps 401–409, i.e., the first time the "No" branch is taken from step 402 after a new interference graph has been built at step 401. When step 502 is executed, the results are saved in a table. Therefore, following the "No" branch from step 401, the optimizer first determines whether the spill strategies have already been computed and stored (step 501). If so, step 502 is by-passed. If not, step 502 is executed as described below. Two alternative methods of determining spill strategy resulting in minimum spill cost are presented here, as illustrated in greater detail in FIG. 7. However, it should be understood that these methods are not necessarily the only ones that could be used to determine minimal spill cost and corresponding spill strategy.

The process of calculating the spill cost for each symbolic register is conceptually equivalent to generating a matrix of cost values 601 as shown in FIG. 6. Each row in the matrix represents a symbolic register which is a spill candidate. Each column in the matrix represents a different spill strategy. Preferably, the different spill strategies are based on a measure of closeness of references to the symbolic register. I.e., in the preferred embodiment a set of spill strategies S is defined, in which for each strategy $S_i$ of the set, a respective "distance" $N_i$ is associated with the strategy, the symbolic register being spilled whenever the "distance" between two successive code references to the symbolic register is $N_i$ or greater. References to a symbolic register which are spaced far apart indicate that the register is not heavily used, and therefore may be a better candidate for spilling. A less aggressive spill strategy is therefore one in which $N_i$ is relatively larger, so that relatively fewer symbolic register uses are eligible for spilling, while a more aggressive spill strategy would use a relatively smaller value of $N_i$. In the preferred embodiment, "distance" is measured in terms of deaths, i.e., the number of live ranges of other symbolic registers which ended (due to the last use of the other registers) between two successive references to the symbolic register under consideration. An "infinite" distance is assigned to symbolic register references which are not contained within the same basic block. However, there are various ways in which "distance" may be measured for this purpose, and the present invention is not necessarily limited to any particular measure of distance. Nor is it necessary that the different spill strategies be tied to the notion of "distance"; the various spill strategies represented by the columns of matrix 601 could be simply arbitrary, unrelated spill strategies.

A cost may be assigned to each row and column location in the cost matrix of FIG. 6 by hypothetically assuming that the symbolic register represented by the row will be spilled according to the spill strategy corresponding to the column. In the preferred embodiment, this means that cost is determined by assuming that the symbolic register will be spilled whenever the distance (number of deaths of other live ranges) between two successive references to the register is $N_i$ or greater, and by computing a resulting cost from that assumption. In general, the cost will be a function of the extra code inserted for a spill, specifically, loads and stores. The exact cost function used will typically be hardware dependent. I.e., different processor designs may associate relatively greater or lesser cost to loads vs. stores vs. other instructions. For example, a rematerialization, i.e., the re-computing of a value as opposed to loading it, may have an associated cost that is different from the cost of a load. Additionally, the cost function will preferably attempt to take into account the frequency of execution of particular loads, stores or other inserted instructions. In the preferred embodiment, it is possible to input statistical frequency data to the compiler for use in optimizing register assignment, and if input, this data may be used to compute the cost function. In the absence of such frequency data, the compiler of the preferred embodiment assumes an execution frequency of $10^L$, where L is the loop nesting depth of the inserted instruction. I.e., if the instruction is not in a loop, a frequency of 1 is assumed; otherwise the frequency is 10, 100 or greater, depending on nesting depth.

In general, the cost function $CRJ_i$ for spilling Register RJ using spill strategy $S_i$ may be represented as:

$$CRJ_i = \Sigma(\text{cost of instruction}) \times (\text{est frequency of execution})$$

which is summed for each instruction (e.g., load, store, or other operation type) which must be inserted in the instruction stream as a result of spilling Register RJ in accordance with spill strategy $S_i$. It should be understood that there are many variations of cost function, and the present invention is not limited to any particular cost function.

In the preferred embodiment, for purposes of cost comparison, an "infinite" cost value is placed in any entry of the cost matrix 601 for which spilling does not result in the partitioning of the live range. I.e, if, for the particular symbolic register in the row, there are no successive references at least $N_i$ deaths apart, then column i (and all columns requiring a higher number of deaths than $N_i$) are assigned "infinite" cost values. While the cost is actually undefined in such cases, an "infinite" cost value prevents selection of the corresponding symbolic register and spill strategy (which would make no sense).

It will be observed that if $CR_N$ represents the cost of an N-death spill strategy (spill whenever there are N or more deaths), for symbolic register R, then for all values of N for which the N-death condition is met at least once:

$$CR_N \leq CR_{N-1} \leq \ldots \leq CR_1.$$

I.e., a minimum cost value for symbolic register R is the cost value for the largest N which will produce a defined cost value.

Figure 7:
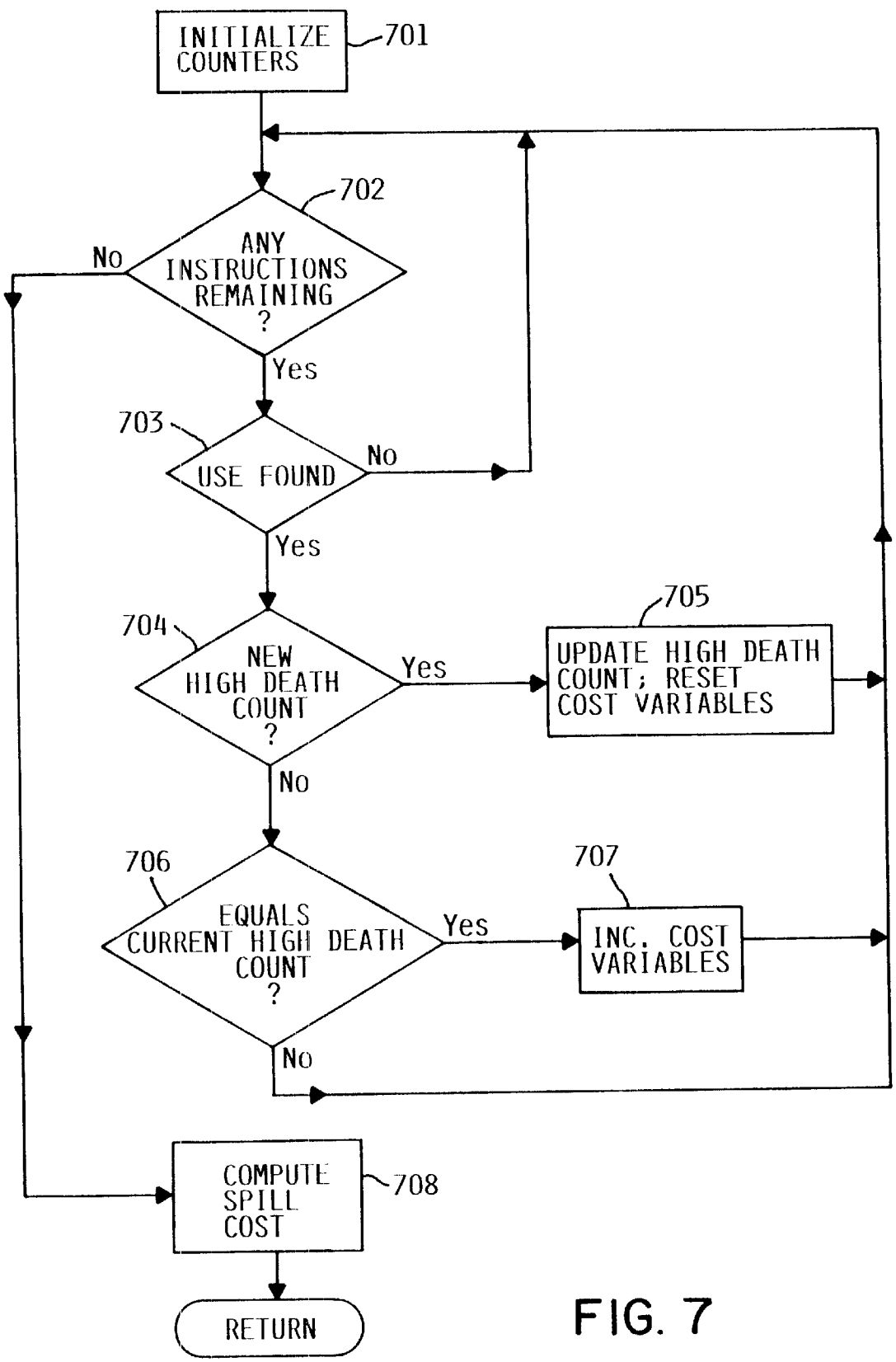
FIG. 7 is a flowchart showing in greater detail the steps performed by the optimizer in evaluating minimum cost for a plurality of spill strategies, according to the preferred embodiment.

In the embodiment of FIG. 7, this fact can be utilized to advantage to reduce the computational complexity of deriving costs. Specifically, while cost matrix 601 theoretically has an indefinite, and possibly infinite, number of columns, it is really only necessary to calculate one cost value for each symbolic register if one can determine the correct spill strategy, i.e., the correct value of N. This can be accomplished by parsing the code to determine the maximum value of N for each symbolic register. The costs computed for these values of N are known to be minimum costs. As shown in FIG. 7, a set of counters is initialized prior to parsing the code (step 701). The counters maintain, for each symbolic register, a running tally of key parameters encountered during parsing. For example, the counters will record, for each symbolic register, the highest death count encountered between two mentions of the symbolic register. The counters will also record parameters needed for the cost function, such as the number of definitions of a symbolic register requiring a store operation, the number of uses requiring a load, etc. The instruction stream is then parsed, until no instructions remain (step 702). Definitions of a symbolic register, death counts, and other quantities are incremented as necessary. When a use of a symbolic register is encountered (step 703), the death count from the previous mention of the register is compared with the highest previous death count encountered for this register (step 704). If the current death count represents a new high for this register, then the highest death count for the register is updated (step 705). At the same time, certain other counters relating to the cost function are also reset, such as the number of load instructions needed for the current spill strategy. The reason for resetting these quantities is that the previous load instructions were computed for a lower death count threshold. If the current death count is equal to the previous high death count (step 706), certain counters such as the number of load instructions are incremented to reflect additional spill code that may be needed for the currently encountered register use. (step 707). If the current death count is below the previous high death count, the counters are not incremented, since the register use will not produce spill code. When the instruction stream is completely parsed and all uses found, the values in the highest death count counters reflect the spill strategy for each respective symbolic register. Furthermore, the tallies in the various cost function counters provide data necessary for computing, for each symbolic register, the cost associated with its spill strategy. At this point, the "No" branch from step 702 is taken. This spill cost is therefore computed from the counter values for each symbolic register (step 708), using the formula described above.

As described above, the embodiment of FIG. 7 could be used to effectively analyze a cost matrix 601 of infinite size, although only one cost value per symbolic register is actually computed. However, it is preferred that there be some limits on the number of death counts considered.

In one variation of the embodiment of FIG. 7, an upper limit is placed on the highest death count recorded. Any death count encountered which exceeds that upper limit is treated as if it equals the upper limit, and thus the death count can not grow unduly large. Preferably, this upper limit would be reduced with each iteration of the coloring process.

Another variation of the embodiment of FIG. 7 is to reduce the number of death counts recorded (i.e., columns in matrix 601) to some small value, e.g., three. Preferably, the death count thresholds used are not fixed, but change with each iteration of the register allocation. I.e., each time step 401 is re-executed and a new interference graph is built, the values of N used for the three columns of the cost matrix change. On the first iteration, these values are infinity, 4 and 1. On the second iteration, these values are infinity, 2 and 1. On the third iteration, the values are 10, 2 and 1. On all subsequent iterations, only a single column having a value of 1 is used. In general, it is rare that four or more iterations are necessary, and in these rare cases there would appear to be some unusual circumstance inhibiting a satisfactory register assignment, for which reason the most aggressive possible strategy is chosen to find a solution to the register allocation problem.

Of course, it would be possible to use different methods than those described herein and illustrated in FIG. 7 for determining a minimal spill strategy and corresponding cost. In particular, it would be possible to compute the cost for each row and column of matrix 601. Where the spill strategies under consideration are arbitrary, unrelated strategies, this may be the only feasible approach.

In selecting a register for possible spilling, it is not simply the cost of spilling that is significant, but the cost vs. the expected benefit. If registers are selected solely on the basis of cost, there will be a tendency to favor registers having small live ranges, where few loads and stores will be required, but also where relatively few edges may be freed. Spilling a register having a larger live range may require more loads and stores, but at the same time may eliminate more edges from the graph, and thus enable other nodes to be removed without the need of spilling. Therefore, it is preferred that the raw cost of spilling a register be divided by a measure of benefit to obtain a ratio or weighted cost. In the preferred embodiment, the measure of benefit is the degree of the node representing the symbolic register (i.e., the number of edges connected to the node). In step 503, the minimum cost determined in step 502 is divided by the degree of the node for each respective symbolic register to produce a weighted cost. However, other measures of benefit, such as taking into account register pressure, could also be used.

After all ratios or weighted costs have been obtained, the register with the lowest weighted cost is selected for possible spilling (step 504).

The amount of spill code that will be generated for a symbolic register depends on the spill strategy that yielded the minimum cost for the selected symbolic register. This spill strategy is saved in a table entry associated with the symbolic register when step 502 is executed. Spill code is generated later, and knowledge of the proper strategy will be necessary to spill at the correct locations. The process then returns to FIG. 4. The selected symbolic register's node is removed from the graph, and the symbolic register put on the assignment stack (step 404). The algorithm then looks for more nodes (step 406), and returns to step 402 to resume the process of removing nodes with fewer than K edges, or select another symbolic register for possible spilling.

When all nodes have been placed on the reduction stack, the "No" branch from step 406 is taken. At this point, registers are assigned to nodes by "coloring" the graph, illustrated as step 407. To "color" the graph, symbolic registers are removed from the assignment stack in reverse order of placement, and assigned an available color (corresponding to a hardware register) at the time of removal from the stack. Any register which can not be colored (because to do so would result in two connected nodes of the same color) is left uncolored, meaning spill is necessary. At the conclusion of this process, if all nodes are colored (step 408) then register allocation is complete. If any node is uncolored, the branch to step 409 is taken, i.e., spill code is generated for the uncolored symbolic registers.

After spill code is generated at step 409, the register allocation process starts all over again with a new iteration at step 401. A new interference graph is built from scratch. Note that the introduction of spill code changes the previous graph by breaking one symbolic register into several symbolic registers, each having a live range which is a subset of the original.

It will be observed that in selecting a symbolic register having K or more edges and removing it from the graph at steps 501–504 and 404, an optimistic assumption is being made that the amount of spill code that will be introduced will be sufficient to justify removal of all the edges. In fact, the compiler doesn't know whether this is true. The spilling of a register and introduction of spill code effectively means that the original live range is broken into multiple smaller live ranges. Even if a load precedes every use of a register, and a store follows every definition, there are still many very brief spans of instructions during which the register is live, and it is possible that one or more of these smaller live ranges will interfere with live ranges of other symbolic registers. This problem exists even with the original Chaitin algorithm which spills most references of a selected register. The algorithm described herein may spill only some references, so there is a greater likelihood that the spill code introduced by an optimistic spill strategy will not be sufficient. However, by building another interference graph and going through the same process again, additional spill code will eventually be generated sufficient to allocate the registers.

Although a specific embodiment of the invention has been disclosed along with certain alternatives, it will be recognized by those skilled in the art that additional variations in form and detail may be made within the scope of the following claims:

What is claimed is:

1. A method for register allocation during code compilation, comprising the steps of:

determining a set of symbolic registers which are potential candidates for spilling;

evaluating a respective minimum cost for each symbolic register in said set of symbolic registers, said minimum cost being a minimum value of a common cost function evaluated for a plurality of different spill strategies, each spill strategy defining a respective portion of a live range of each symbolic register for spilling; and selecting the symbolic register having the lowest minimum cost for spilling.

2. The method of claim 1, wherein said cost function is a function of spill code required to spill a symbolic register to memory.

3. The method of claim 2, wherein said cost function includes a division by a benefit factor.

4. The method of claim 2, wherein said cost function is further a function of an estimated frequency of execution of operations required to spill a symbolic register to memory.

5. The method of claim 1, wherein said step of determining a set of symbolic registers which are potential candidates for spilling to memory comprises the steps of:

building an interference graph comprising a plurality of nodes connected by edges, each node of said interference graph representing a respective symbolic register, each edge representing the overlap of the live ranges of the symbolic registers represented by the pair of nodes connected by the edge; and iteratively removing all nodes having fewer than K edges connected thereto, where K is the number of hardware registers available for allocation, until all remaining nodes have at least K edges.

6. A method for register allocation during code compilation, comprising the steps of:

determining a set of symbolic registers which are potential candidates for spilling;

evaluating a respective minimum cost for each symbolic register in said set of symbolic registers, said minimum cost being a minimum value of a cost function evaluated for a plurality of spill strategies, wherein said plurality of spill strategies comprise a set of code distance measures, each code distance measure of said set corresponding to a respective spill strategy, wherein the spill strategy-comprises inserting spill code between successive uses of a symbolic register separated by at least the respective code distance measure, and not inserting spill code otherwise; and selecting the symbolic register having the lowest minimum cost for spilling.

7. The method of claim 6, wherein said code distance measure is the number of deaths of live ranges.

8. A computer program product for register allocation during code compilation, said computer program product comprising:

a plurality of processor executable instructions recorded on signal-bearing media, wherein said instructions, when executed by a processor of a computer, cause said computer to perform the steps of:

determining a set of symbolic registers which are potential candidates for spilling;

evaluating a respective minimum cost for each symbolic register in said set of symbolic registers, said minimum cost being a minimum value of a common cost function evaluated for a plurality of different spill strategies, each spill strategy defining a respective portion of a live range of each symbolic register for spilling; and selecting the symbolic register having the lowest minimum cost for spilling.

9. The computer program product of claim 8, wherein said cost function is a function of spill code required to spill a symbolic register to memory.

10. The computer program product of claim 9, wherein said cost function includes a division by a benefit factor.

11. The computer program product of claim 9, wherein said cost function is further a function of an estimated frequency of execution of operations required to spill a symbolic register to memory.

12. The computer program product of claim 8, wherein said step of determining a set of symbolic registers which are potential candidates for spilling to memory comprises the steps of:

building an interference graph comprising a plurality of nodes connected by edges, each node of said interference graph representing a respective symbolic register, each edge representing the overlap of the live ranges of the symbolic registers represented by the pair of nodes connected by the edge; and iteratively removing all nodes having fewer than K edges connected thereto, where K is the number of hardware registers available for allocation, until all remaining nodes have at least K edges.

13. A computer program product for register allocation during code compilation, said computer program product comprising:

a plurality of processor executable instructions recorded on signal-bearing media, wherein said instructions, when executed by a processor of a computer, cause said computer to perform the steps of:

determining a set of symbolic registers which are potential candidates for spilling;

evaluating a respective minimum cost for each symbolic register in said set of symbolic registers, said minimum cost being a minimum value of a cost function evaluated for a plurality of spill strategies, wherein said plurality of spill strategies comprise a set of code distance measures, each code distance measure of said set corresponding to a respective spill strategy, wherein the spill strategy comprises inserting spill code between successive uses of a symbolic register separated by at least the respective code distance measure, and not inserting spill code otherwise; and selecting the symbolic register having the lowest minimum cost for spilling.

14. The computer program product of claim 13, wherein said code distance measure is the number of deaths of live ranges.

15. A computer system for compiling a computer program, comprising:

a processor;

a memory for storing instructions and data;

a compiler embodied as a plurality of instructions executable on said processor from said memory, said compiler including:

(a) an optimizer that allocates symbolic registers to physical registers, said optimizer producing spill code for selected symbolic registers, wherein said optimizer selects symbolic registers for spilling by evaluating a respective minimum cost for each of a plurality of symbolic registers said minimum cost being a minimum value of a cost function evaluated for a plurality of spill strategies, said plurality of spill strategies comprising a set of code distance measures, each code distance measure of said set corresponding to a respective spill strategy, wherein the spill strategy comprises inserting spill code between successive uses of a symbolic register separated by at least the respective code distance measure, and not inserting spill code otherwise; and (b) a machine-readable code generator that generates a machine-readable representation of the computer program from output of the optimizer.

16. The computer system of claim 15, wherein said compiler further includes:

(c) a front-end which generates an intermediate representation of said computer program from source code for input to said optimizer.

* * * * *